UNITED STATES PATENT OFFICE.

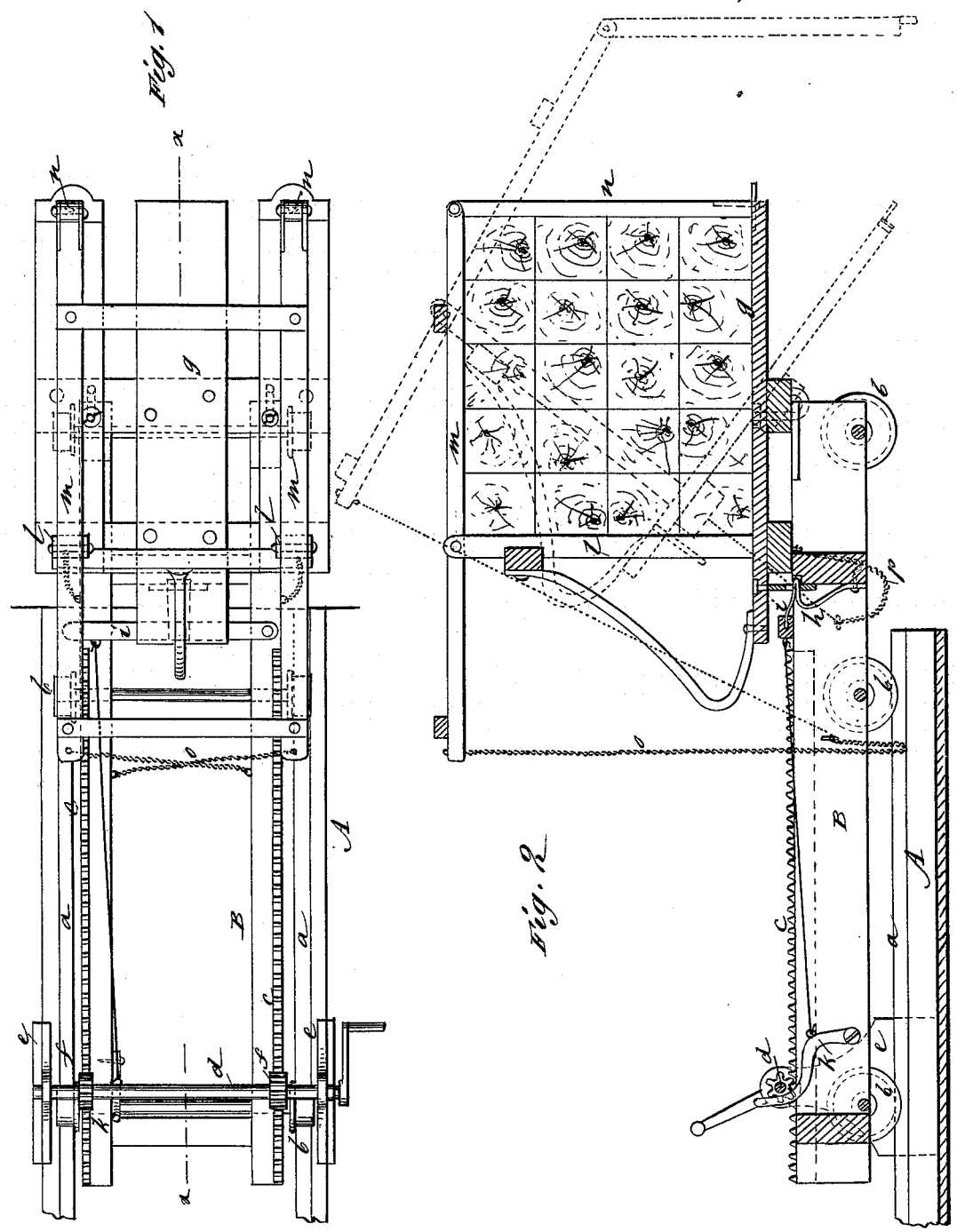

MARK A. DEES, OF SCRANTON, MISSISSIPPI.

IMPROVEMENT IN TRUCKS FOR LOADING LOCOMOTIVE-TENDERS.

Specification forming part of Letters Patent No. 220,353, dated October 7, 1879; application filed July 2, 1879.

*To all whom it may concern:*

Be it known that I, MARK A. DEES, of Scranton, in the county of Jackson and State of Mississippi, have invented a new and Improved Truck for Supplying Fuel to Locomotive-Tenders, of which the following is a specification.

The object of my invention is to construct apparatus for loading wood or coal upon locomotive-tenders in the required quantity at once in place of tossing the fuel by hand, as usually practiced, thereby saving time, and, in the case of wood, packing it more closely on the tender.

My invention consists in a truck adapted for being moved on a track by means of a rack and pinion, whereby one end may be projected over the tender, and fitted at its end with a tilting platform for receiving the fuel and discharging it.

The construction and operation will be more particularly described in connection with the accompanying drawings, wherein—

Figure 1 is a plan view of the apparatus adapted for loading wood. Fig. 2 is a vertical longitudinal section of the same on line $xx$ of Fig. 1.

Similar letters of reference indicate corresponding parts.

A is a tramway, which is to be laid permanently at the usual or desired place for supplying the locomotive with fuel, and preferably at a "cut," so that the tramway will be about on a level with the top of the tender. It may, however, be raised by suitable supports to the desired level, and inclined planes or platforms may be built, on which the wood can be rolled up with wheelbarrows to the truck.

The tracks $a\ a$ consist of wooden or iron rails, and are laid at right angles to the railroad-track, the inner ends of the rails $a$ terminating near the main track.

Upon the tracks $a$ is a truck, B, supported by three pairs of wheels, $b$, one pair at each end and a pair intermediately and near the inner end.

Upon the side rails of truck B racks $c\ c$ are fitted, and upon a cross-shaft, $d$, that is fitted above the truck in the fixed bearings $e$, are pinions $f\ f$, which mesh with racks $c\ c$.

The shaft $d$ is provided with a crank-handle, so that it may be turned and the truck B thereby moved back and forth on the tracks $a$.

Upon the inner end of truck B is hung a platform, $g$, by eyes, staples, or other suitable devices, which permit the platform to swing forward and back. These hinge-connections are placed about midway of the platform, so that one end of the platform projects over the end of the truck.

The platform is prevented from tipping, when loaded, by a spring-latch, $h$, which is connected to a sliding bar, $i$, that is hung on truck B. This bar $i$ is connected by a cord or chain with a trigger, $k$, attached upon the outer end of the truck, by which the latch can be released.

Upon the back end of the platform $g$ are fixed stanchions $l\ l$, upon the top of which levers $m\ m$ are hung. These levers $m$ carry at one end swinging stanchions $n\ n$, which are provided with pins at their swinging end for entering holes in the forward end of the platform, so that the wood may be piled upon the platform, and the stanchions $l\ n$ will retain the same in place, as shown in Fig. 2. To the opposite end of the lever $m$ chains $o$ are connected, which are also attached to the truck, and there are also chains $p$ connected with the truck and platform for limiting the forward tilting movement of the latter.

When the tender is to be supplied with fuel, the truck B, carrying the wood piled upon the platform, is moved forward on the tracks $a$ by means of the gearing.

The inner end of the truck will usually be projected beyond the end of tracks $a$, as shown in Fig. 2, and the platform $g$ be thereby brought over the tender. When this position is reached the trigger $k$ comes in contact with the shaft $d$, releasing the latch $h$, and the platform being overbalanced by the wood it is tilted forward. When partly over the chains D pull out the stanchions $n$, and the load falls into the tender. The platform $g$ then returns to place, and the truck is run back for loading.

By these means the fuel can be loaded on a tender with a great saving of time and labor over methods heretofore practiced, and the wood will also be piled on the tender more compactly, so that a larger quantity can be loaded.

The apparatus may be used to supply coal with equal facility by constructing the tilting platform with a bin having its delivery end fitted to swing in the same manner as the stanchions *n*, and it is intended that one load of the platform shall be sufficient to give a locomotive the required supply.

The apparatus may also be used for loading and unloading freight.

Having thus described my invention, I claim as new and desire to secure by Letters Patent—

1. In apparatus for supplying fuel to locomotives, the truck B, tilting platform *g*, fixed stanchions *l*, lever *m*, and swinging stanchions *n*, combined for operation substantially as and for the purposes set forth.

2. In apparatus for supplying fuel to locomotives, the combination, with the truck B and its tilting platform *g*, of the spring-latch *h* and trigger *k*, substantially as and for the purpose set forth.

MARK ASHLEY DEES.

Witnesses:
M. B. RICHMOND,
GEO. W. WILKES.